(12) United States Patent
Cohen et al.

(10) Patent No.: US 12,380,218 B2
(45) Date of Patent: Aug. 5, 2025

(54) SYSTEMS AND METHODS FOR INSPECTING BROWSER SECURITY VULNERABILITIES

(71) Applicant: APOMAYA, Redwood City, CA (US)

(72) Inventors: Ian Cohen, Redwood City, CA (US); Jeremy Barnett, Redwood City, CA (US); Peter Joles, Redwood City, CA (US)

( * ) Notice: Subject to any disclaimer, the term of this patent is extended or adjusted under 35 U.S.C. 154(b) by 190 days.

(21) Appl. No.: 17/966,702

(22) Filed: Oct. 14, 2022

(65) Prior Publication Data

US 2024/0039947 A1  Feb. 1, 2024

Related U.S. Application Data

(60) Provisional application No. 63/393,796, filed on Jul. 29, 2022.

(51) Int. Cl.
*G06F 21/57* (2013.01)
*G06F 21/62* (2013.01)
(Continued)

(52) U.S. Cl.
CPC ........ *G06F 21/577* (2013.01); *G06F 21/6245* (2013.01); *G06F 21/645* (2013.01);
(Continued)

(58) Field of Classification Search
CPC .. G06F 21/577; G06F 21/6245; G06F 21/645; G06F 2221/034; H04L 63/1433; H04L 63/1483
See application file for complete search history.

(56) References Cited

U.S. PATENT DOCUMENTS 8,079,080 B2 * 12/2011 Borders ............... G06F 21/606
  726/13
8,752,183 B1 * 6/2014 Heiderich ............. G06F 21/577
  726/25

(Continued)

FOREIGN PATENT DOCUMENTS

WO  WO-2008016915 A2 *  2/2008  ............. H04L 63/12
WO  WO-2011094312 A1 *  8/2011  ........... G06F 21/554

OTHER PUBLICATIONS

Toreini et al.; "DOMtegrity: ensuring web page integrity against malicious browser extensions", 2019, Springer, International Journal of Information Security, pp. 801-814. (Year: 2019).*

(Continued)

*Primary Examiner* — Matthew Smithers
(74) *Attorney, Agent, or Firm* — BAKER HOSTETLER LLP

(57) ABSTRACT

Systems and methods are provided for inspecting, identifying, blocking, and combatting browser security vulnerabilities. In various embodiments, an inspection module may execute on a browser accessing a web domain on a first computing device. Inspection modules may dynamically analyze a set of scripts associated with the web domain to identify privacy vulnerabilities. Such vulnerabilities may be blocked and/or combatted to prevent communications of private information to one or more third-, fourth-, . . . , nth-party sites and applications. Embodiments may generate a customized privacy plan directed to one or more privacy vulnerabilities and execute on a graphical user interface on a computing device.

16 Claims, 11 Drawing Sheets

(51) Int. Cl.
  *G06F 21/64* (2013.01)
  *H04L 9/40* (2022.01)
(52) U.S. Cl.
  CPC ...... *H04L 63/1433* (2013.01); *H04L 63/1483* (2013.01); *G06F 2221/034* (2013.01)

(56) References Cited

U.S. PATENT DOCUMENTS

| | | | | |
|---|---|---|---|---|
| 8,752,208 | B2 * | 6/2014 | Shulman | H04L 67/561 |
| | | | | 713/153 |
| 8,832,834 | B2 * | 9/2014 | Lee | H04L 63/1483 |
| | | | | 726/22 |
| 8,949,990 | B1 * | 2/2015 | Hsieh | H04L 63/1433 |
| | | | | 726/25 |
| 9,038,184 | B1 * | 5/2015 | Mann | G06F 21/563 |
| | | | | 726/24 |
| 9,178,904 | B1 * | 11/2015 | Gangadharan | H04L 9/40 |
| 9,392,003 | B2 * | 7/2016 | Amsler | H04L 63/1408 |
| 9,686,288 | B2 * | 6/2017 | Kikuchi | H04L 63/102 |
| 9,906,553 | B1 * | 2/2018 | Ainslie | H04L 63/1475 |
| 10,108,817 | B2 * | 10/2018 | Riva | H04L 63/0421 |
| 10,681,063 | B1 * | 6/2020 | Silva | G06F 21/577 |
| 11,777,992 | B1 * | 10/2023 | Cross | H04L 63/0876 |
| | | | | 726/5 |
| 2007/0107057 | A1 * | 5/2007 | Chander | G06F 21/54 |
| | | | | 726/22 |
| 2007/0136579 | A1 * | 6/2007 | Levy | H04L 63/102 |
| | | | | 713/168 |
| 2009/0132481 | A1 * | 5/2009 | Toub | G06F 16/958 |
| 2010/0037317 | A1 * | 2/2010 | Oh | G06F 21/554 |
| | | | | 726/23 |
| 2010/0125913 | A1 * | 5/2010 | Davenport | G06F 21/55 |
| | | | | 726/25 |
| 2011/0289582 | A1 * | 11/2011 | Kejriwal | H04L 63/14 |
| | | | | 726/22 |
| 2014/0173744 | A1 * | 6/2014 | Borohovski | H04L 63/1433 |
| | | | | 726/25 |
| 2015/0074390 | A1 * | 3/2015 | Stoback | H04L 63/1483 |
| | | | | 713/156 |
| 2016/0323309 | A1 * | 11/2016 | Sethi | H04L 63/1466 |
| 2018/0018465 | A1 * | 1/2018 | Carey | G06F 21/50 |
| 2018/0218145 | A1 * | 8/2018 | Hussain | H04L 63/10 |
| 2019/0108353 | A1 * | 4/2019 | Sadeh | G06F 21/6245 |
| 2019/0132355 | A1 * | 5/2019 | Egbert | H04L 63/1483 |
| 2021/0012021 | A1 * | 1/2021 | Pickhardt | G06F 21/53 |
| 2022/0272127 | A1 * | 8/2022 | Yawalkar | H04L 63/1433 |
| 2023/0038796 | A1 * | 2/2023 | Bhatkar | H04L 63/1433 |
| 2023/0039079 | A1 * | 2/2023 | Philip | G06F 21/577 |
| 2023/0403300 | A1 * | 12/2023 | Narayan | H04L 63/20 |
| 2024/0354151 | A1 * | 10/2024 | Argov | G06F 21/6263 |
| 2024/0378267 | A1 * | 11/2024 | Argov | G06F 21/64 |
| 2024/0394412 | A1 * | 11/2024 | Shin | G06F 21/6245 |

OTHER PUBLICATIONS

Pawade et al.; "Implementation of Extension for Browser to Detect Vulnerable Elements on Web Pages and Avoid Clickjacking", 2016, IEEE, pp. 226-230. (Year: 2016).*

Hamed et al.; "Privacy Risk Assessment for Web Tracking", 2016, IEEE, Canadian Conference on Electrical and Computer Engineering (CCECE), pp. 1-6. (Year: 2016).*

Acker et al.; "Monkey-in-the-browser: Malware and Vulnerabilities in Augmented Browsing Script Markets", 2014, ACM, pp. 525-530. (Year: 2014).*

Barua et al.; "Protecting Web Browser Extensions from JavaScript Injection Attacks", 2013, International Conference on Engineering of Complex Computer Systems, pp. 188-197. (Year: 2013).*

Rehman et al.; "On Detection and Prevention of Clickjacking Attack for OSNs", 2013 11th International Conference on Frontiers of Information Technology, pp. 160-165. (Year: 2013).*

Dhawan et al.; "Analyzing Information Flow in JavaScript-based Browser Extensions", 2009 Annual Computer Security Applications Conference, pp. 382-391. (Year: 2009).*

Kerschbaumer et al.; "Hardening Firefox against Injection Attacks", 2020, IEEE, pp. 653-663. (Year: 2020).*

Barua et al.; "Protecting Web Browser Extensions from JavaScript Injection Attacks", 2013, IEEE, pp. 188-197. (Year: 2013).*

Dhawan et al.; "Analyzing Information Flow in JavaScript-based Browser Extensions", 2009, IEEE, pp. 382-391. (Year: 2009).*

* cited by examiner

SYSTEMS AND METHODS FOR INSPECTING BROWSER SECURITY VULNERABILITIES

SUMMARY

The present disclosure provides exemplary systems and methods for providing privacy and data protection. In various embodiments, privacy and data protection systems and methods may be executed on a browser operating on a computing device, and prevent communication of information, including personal identifying information (PII), and other browsing activities to various third-party sites. As such, systems and methods may inspect, identify, block and combat browser security vulnerabilities. In various embodiments, an inspection module may execute on a browser accessing or requesting to access a web domain on a first computing device. An inspection module may dynamically analyze a set of scripts associated with the web domain to identify privacy vulnerabilities. Such vulnerabilities may be blocked and/or combatted to prevent communications of private information to one or more third-, fourth-, ..., nth-party sites and applications. Embodiments may generate a customized privacy plan directed to one or more privacy vulnerabilities and execute on a graphical user interface on a computing device.

BRIEF DESCRIPTION OF THE DRAWINGS

The summary, as well as the following detailed description, is further understood when read in conjunction with the appended drawings. For the purpose of illustrating the disclosed subject matter, there are shown in the drawings attached as "Appendix" exemplary embodiments of the disclosed subject matter; however, the disclosed subject matter is not limited to the specific methods, compositions, and devices disclosed. In addition, the drawings are not necessarily drawn to scale.

DETAILED DESCRIPTION

The present disclosure can be understood more readily by reference to the following detailed description taken in connection with the accompanying figures and examples, which form a part of this disclosure. It is to be understood that this disclosure is not limited to the specific devices, methods, applications, conditions or parameters described and/or shown herein, and that the terminology used herein is for the purpose of describing particular embodiments by way of example only and is not intended to be limiting of the claimed subject matter.

Also, as used in the specification including the appended claims, the singular forms "a," "an," and "the" include the plural, and reference to a particular numerical value includes at least that particular value, unless the context clearly dictates otherwise. The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable. It is to be understood that the terminology used herein is for the purpose of describing particular aspects only and is not intended to be limiting.

It is to be appreciated that certain features of the disclosed subject matter which are, for clarity, described herein in the context of separate embodiments, can also be provided in combination in a single embodiment. Conversely, various features of the disclosed subject matter that are, for brevity, described in the context of a single embodiment, can also be provided separately or in any sub-combination. Further, any reference to values stated in ranges includes each and every value within that range. Any documents cited herein are incorporated herein by reference in their entireties for any and all purposes.

Figure 1:
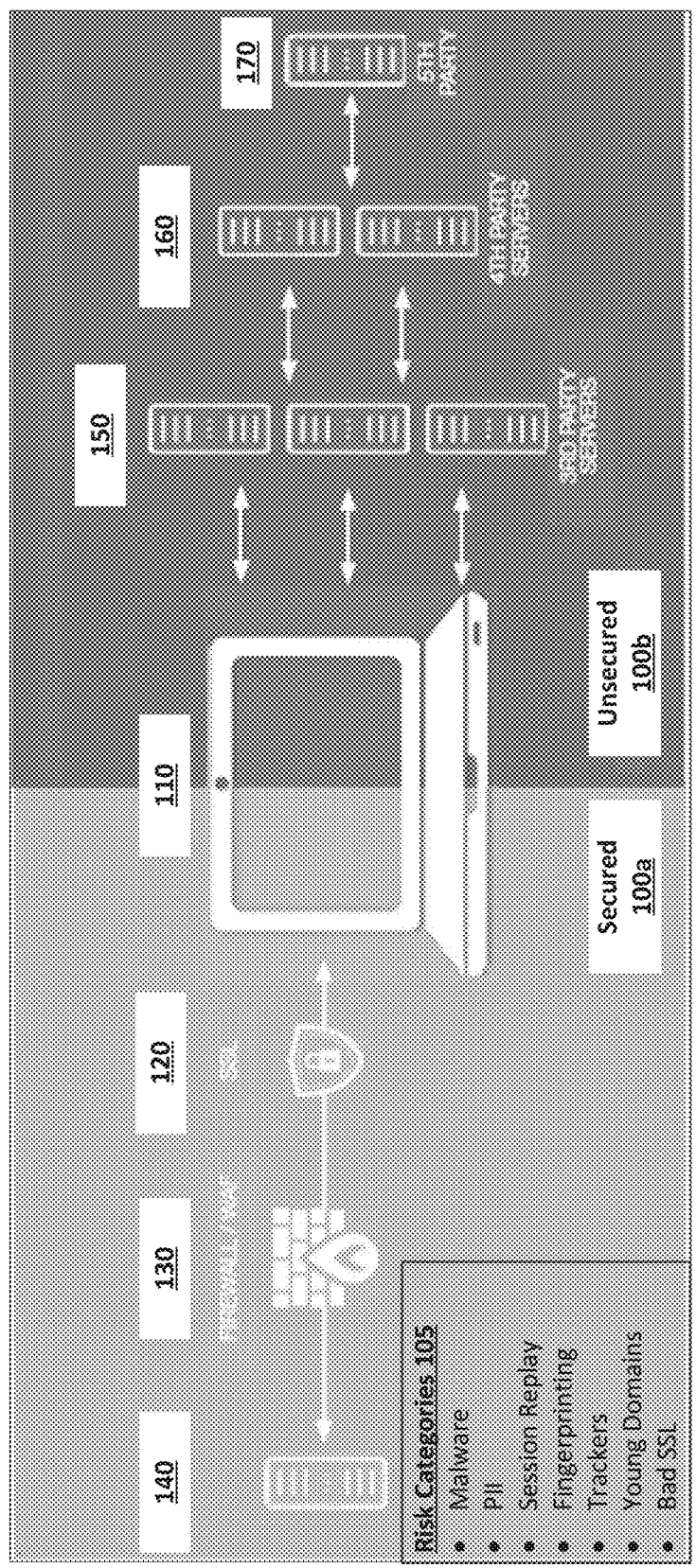
FIG. 1 illustrates a comparison between secured and unsecured computing system configuration.

FIG. 1 illustrates a diagram of a computing system 110 and comparing differences between a secured configuration 100a and an unsecured configuration 100b. When a computing device accesses a website, for example, it may connect to a plurality of direct and indirect parties 150, 160, 170. Such external parties may be requesting information about the device and/or user accessing the website, obtain data regarding a location, configuration or other information about the computing system 110. Such information may be passed on the third party servers 150, which are in communication with the web domain and may receive information directly. Such external third parties 150 may, in turn, pass the gathered data to fourth parties 160, then to fifth parties 170, and so on to nth parties.

As such, data, which may be unknowingly collected about the computing system 110 can be sent to various parties. The external parties may then use this data, sometime in a malicious fashion. As such, security vulnerabilities may be created. The transfer of data further creates privacy concerns, as the computing system 110 and its users may not want information about their system and use to be shared amongst external parties. But in an unsecured network environment 100b, such information is easily shareable.

In a secured networking environment 100a, which embodiments of the present invention may utilize, various tools and techniques may be implemented to ensure data transfers are blocked and/or occur based on user preferences. In various configurations, a secure sockets layer (SSL) 120, or other encryption-based security protocol may be applied to encrypt communications and increase privacy.

Figure 2:
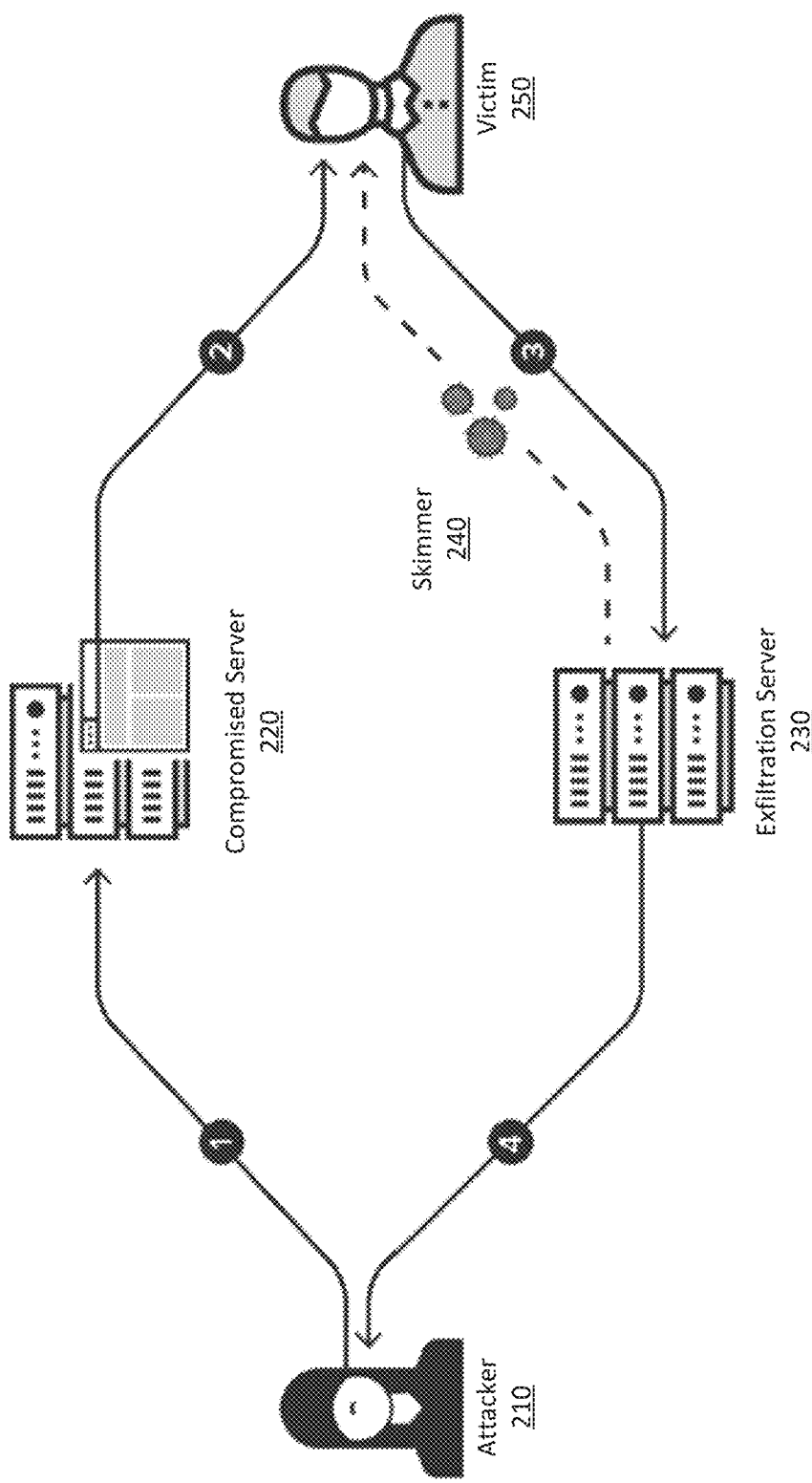
FIG. 2 illustrates an example privacy and security risk occurring via a browser.

A firewall 130 is another technique to improve security, by monitoring traffic to and from a network. As such, communications between computing system 110 and external server 140 may be monitored via a firewall. In examples, the firewall can permit certain blocks of data/data packets, or block other types of data, based on a defined security protocol FIG. 2 illustrates an example privacy and security risk occurring via a browser. In the example, an attacker 210 may access and/or communicate with a compromised server 220. The compromised server 220 may be an unsecured server or computing system, as discussed in FIG. 1. The server 220 may be utilized, accessed, or otherwise associated with victim 250. Accordingly, the attacker 210 has access to the victim 250.

Data exfiltration can occur via an exfiltration server 230 and an optional use of a skimmer 240 to assist in obtaining information about the victim. Data exfiltration can include, for example, malware, malicious code, unauthorized access or data transfer, or other security breach. A skimmer 240 may be a method in which information is surreptitiously obtained. Information about the victim 250 may relate to one or more of personally identifiable information (PII), such as a name, address, biographical information, medical information, financial information, and the like. Information obtainable may relate to the victim's online browsing habits, purchases, computer hardware, or any of a plurality of information relating to online behaviors. Such information may be obtained via the exfiltration server 230 and provided to the attacker 210, who may utilize the information, potentially maliciously against the victim, or otherwise profit off the information.

Figure 3:
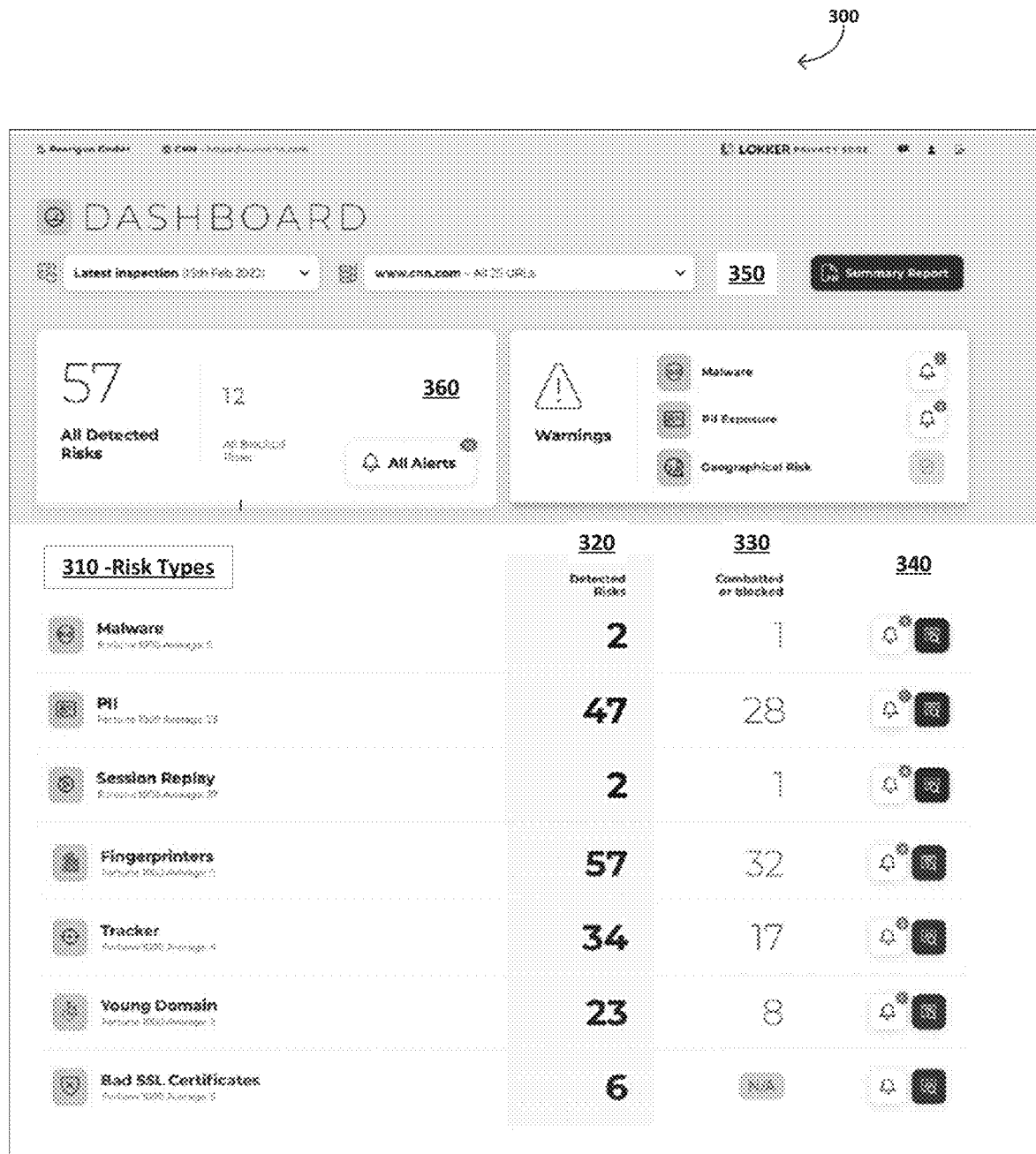
FIG. 3 illustrates a dashboard executable on a graphical user interface, usable with embodiments discussed herein.

FIG. 3 illustrates a dashboard 300 executable on a graphical user interface. The dashboard provides an ability to identify and assess potential risks and vulnerabilities related to online activity, e.g., browsing through websites. The customizable dashboard enables users to set their privacy preferences related to a plurality of different risk types, including but not limited to malware, PII, session replay, fingerprinting, trackers, young domains, and bad secure socket layer (SSL) certifications.

A header 350 may provide information about a site being analyzed, a date and time of inspection, along with an optional, downloadable summary report. A pair of headers 360 may provide a snapshot of all detected risks (e.g., 57) for that particular site, and a total number of detected risks. Alerts related to the overview may provided as well. The pair of headers 360 may further provide a snapshot of warnings indicative of key security vulnerabilities and/or risks associated with the site. For example, malware, PII exposure, and geographical risk may be the top security vulnerabilities associated with the website. In various embodiments, the risk detection activity can occur periodically, e.g., hourly, daily, monthly, etc., manually, or according to a pre-defined schedule.

The dashboard may provide and overview of detected risks 320, which may have been detected during the user's interaction with one or more sites, with a particular site, or even known risks associated with a site. The dashboard may further provide an overview of combated or blocked risks 330, thereby providing a quick, visual overview of security risks associated with one or more sites. Alerts and notifications 340 may be configured for various risk types. For example, when a type of risk is detected, e.g., a malware risk, the alert may provide a notification to the user.

Figure 4:
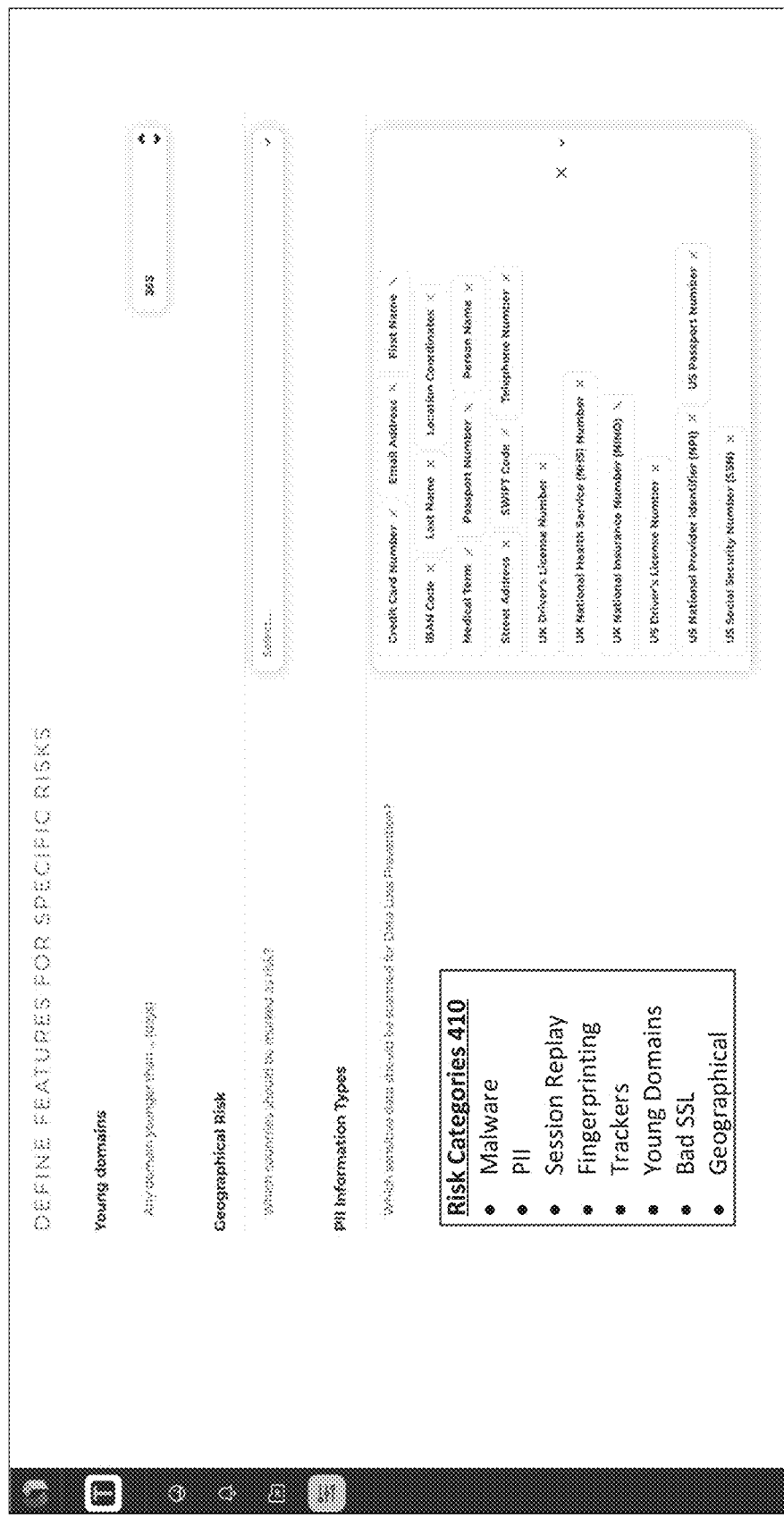
FIG. 4 illustrates customizable risk preferences, usable with embodiments discussed herein.

FIG. 4 illustrates customizable risk preferences, usable with embodiments discussed herein. The dashboard configuration of FIG. 4 may allow users to define features for specific risks. Risks may fall into one or more risk categories 410, including but not limited to malware, PII, session replay, fingerprinting, trackers, young domains, a cookie request, a phishing attempt, a URL redirection, bad SSL, and geographical risks.

Each risk category may be further customizable with a set of options to define how the risk should be treated. For example, in the young domain category, any domains younger than a certain number of days (e.g., 365) may be flagged and addressed.

In another example, for geographical risks, one or more countries may be marked as risks. As such, traffic to or from domains or sites associated with those risk locations may be blocked, filtered, or otherwise monitored.

In yet another example, with respect to PII information, a user may select the types of PII to track and/or prevent from being sent to external parties. Examples of possible PII include a credit card number, email address, first name, last name, IBAN code, location, coordinates, medical term, medical information, passport numbers, street address, person name, SWIFT code, telephone number, drivers license number, national health service numbers, national provider identifier, citizenship, social security number, and any of a plurality of information associated with the individual.

Figure 5:
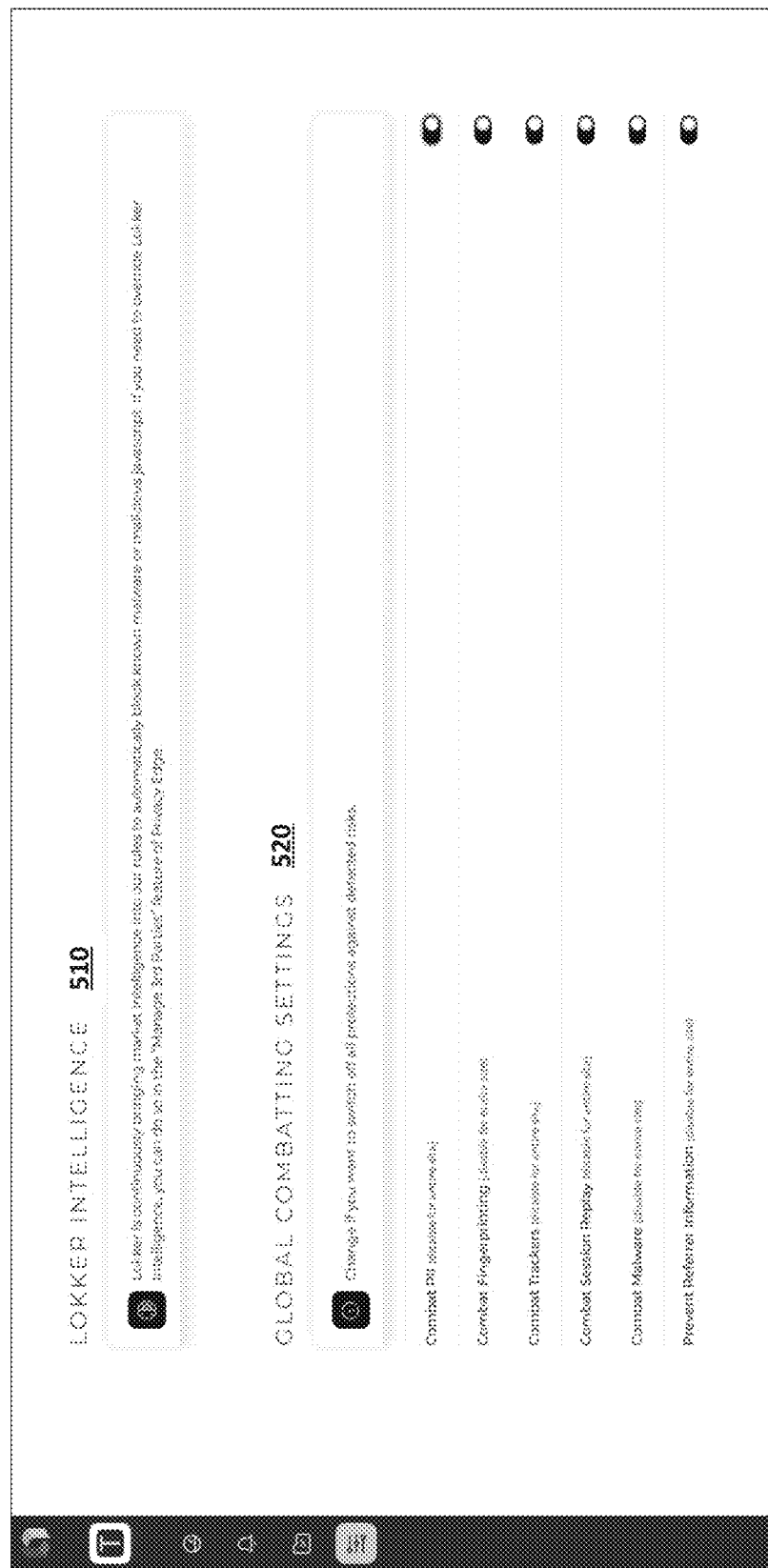
FIG. 5 illustrates risk combatting settings, usable with embodiments discussed herein.

FIG. 5 illustrates risk combatting settings, usable with embodiments discussed herein. Various artificial intelligence and machine learning techniques may be utilized to continuously generate rules and update approaches and techniques to block malware and malicious activity.

In various embodiments, global combatting settings 520 may be customized and applied to protect against particular detected risks. In a first example, PII may be combated by disabling PII transfers for an entire site. Fingerprinting, trackers, session, replay, malware, and preventing referrer information can likewise be disabled for an entire site.

Figure 6:
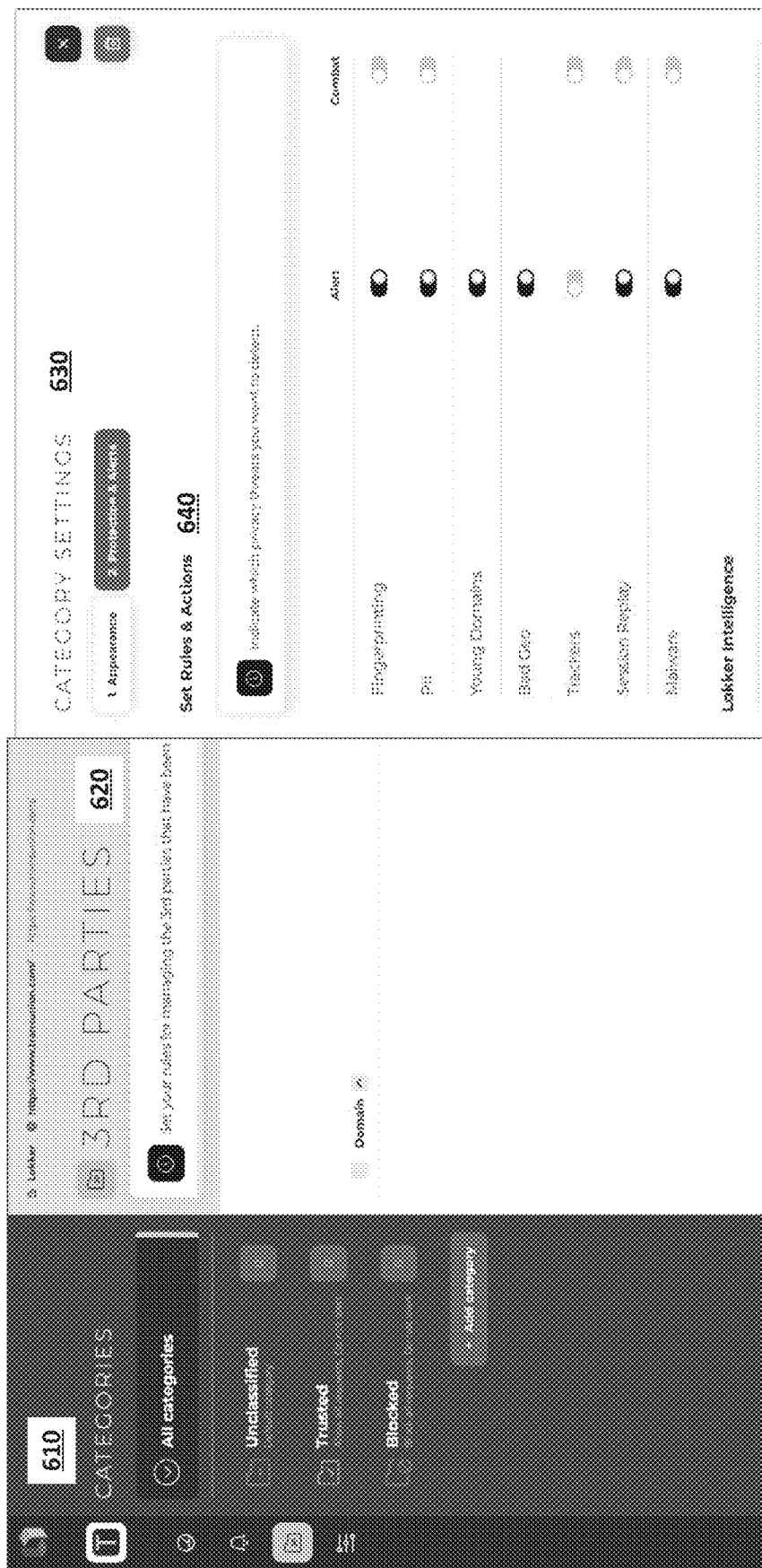
FIG. 6 illustrates additional risk management options and categorizations, in accordance with embodiments discussed herein.

FIG. 6 illustrates additional risk management options and categorizations, in accordance with embodiments discussed herein. Sites can be categorized based on their security status and/or risk level. Categories 610 may include unclassified, trusted, and blocked. Unclassified is the default categorization for sites. The trusted categorization may indicate a reduced or acceptable level of vulnerability for a user. Settings associated with the Trusted designation may allow all requests to be fulfilled. Alerts will not occur for trusted sites. Sites in the Blocked category may block all requests for information. Alerts may be toggled on or off as desired.

For the sites within each category, information about Third Parties 620 which may be accessing or requesting information from the site may be provided. A selection of a category or a site may open a window to display third parties that may be related to the site.

Category settings 630 may be customized to reflect user preferences for each category. The category's appearance may be changed, and protection and alert settings for each may be changed as well. In an example, as illustrated in FIG. 6, alerts for fingerprinting, PII, young domains, bad geo, session replay, and malware may be toggled on, while tracker alerts may be toggled off. Combating actions may be toggled on or off. As illustrated in the example of FIG. 6, all combatting actions are toggled off. It should appreciated that various combinations, alerts, techniques, and preferences may be implemented via the dashboard. The dashboard enables a unique customization for users to track sites, data, and create a personalized privacy and security plan.

Inspection Techniques

Figure 7:
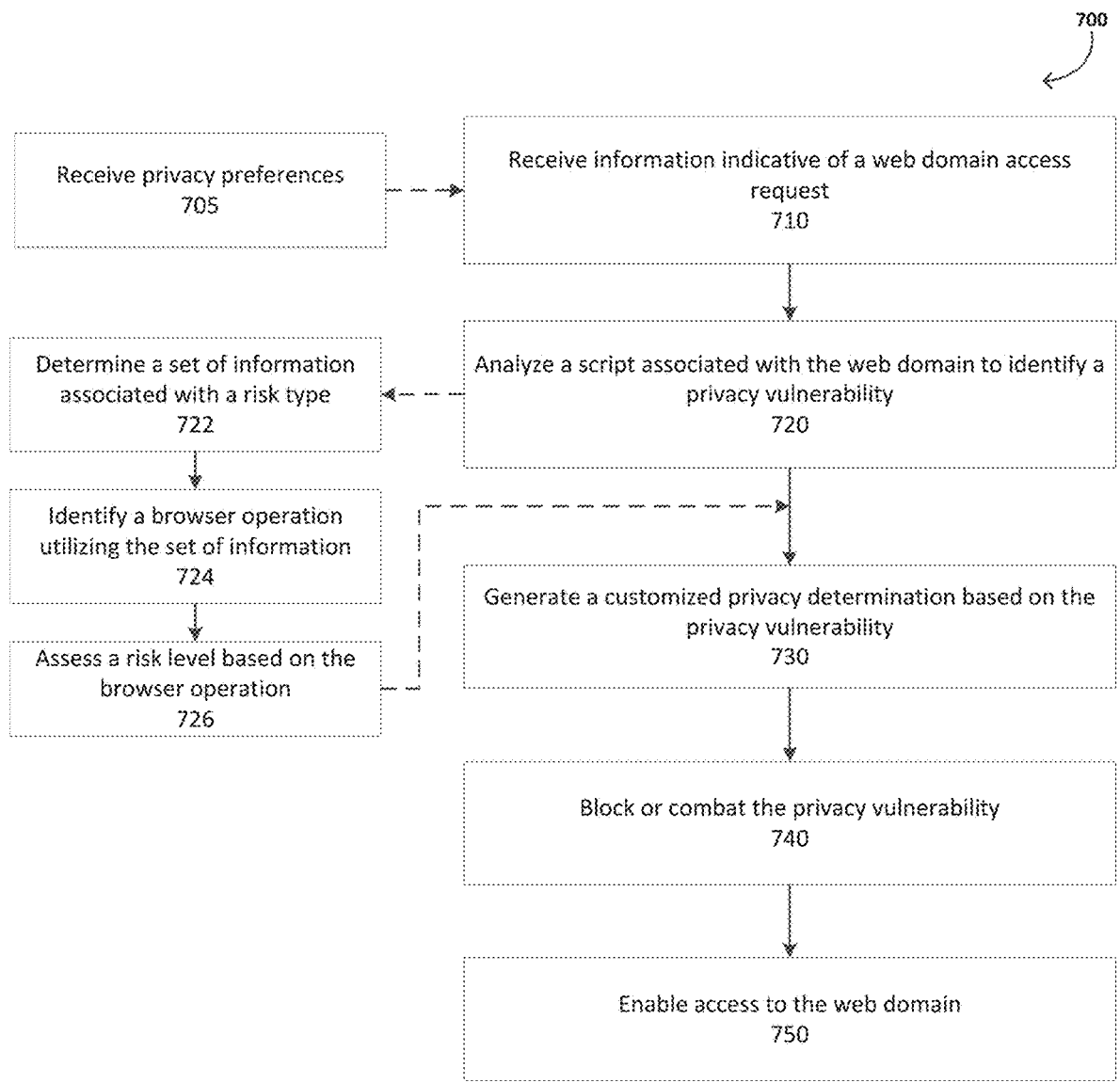
FIG. 7 illustrates a flowchart for inspection techniques usable with embodiments discussed herein.

FIG. 7 illustrates a flowchart for inspection techniques in accordance with exemplary examples discussed herein. Systems and methods may analyze browser security vulnerabilities through one or more inspection techniques 700. In various embodiments, inspection techniques may utilize harvesting techniques and crawl sites to identify and inspect vulnerabilities and risk factors. In various examples, an inspection module may analyze a script associated with a particular URL and identify at least one vulnerability. Methods and techniques to combat the vulnerability may be generated prior to access by the browser. The methods and techniques may categorize the web domain, for example, into an unclassified, trusted, or blocked category, as discussed herein. The categorizations may be customizable to regions, varying trust levels, routines, site types, and a plurality of other considerations configurable to the user customizations.

At block 705, embodiments may receive privacy preferences. As discussed herein, the privacy settings may be received via a dashboard or graphical user interface. The privacy settings may be indicative of a type of information to be monitored or prevented from being sent to a third party. The privacy settings may relate to one or more of the risk categories and types discussed herein, including but not limited to malware, PII, session replay, fingerprinting, trackers, young domains, a cookie request, a phishing attempt, a URL redirection, and bad SSL. Privacy settings may also be based on a location or geographical preference. For example, information requests by other parties in certain countries and/or geographical locations may be blocked, while other locations may be allowed.

As described herein, the privacy settings are fully customizable and may be tailored to a particular user preference, organizational preference, or any of a combination of considerations.

At block 710, embodiments may receive information indicative of a web domain access request. For example, a computing device may attempt to access a website. In other examples, the computing device may already be accessing the web domain.

At block 720, embodiments may analyze a script associated with the web domain to identify a privacy vulnerability. The privacy vulnerability may relate to the privacy setting categories noted above. A privacy vulnerability may be associated with one or more characteristics to identify the privacy vulnerability. For example, a PII privacy vulnerability may be identified by instructions indicative of sending information about one or more of a user, an interaction on the web domain, a computing device associated with the user and the like.

Blocks 722, 724, and 726 indicate an example method for analyzing one or more scripts associated with the web domain.

At block 722, embodiments may determine a set of information associated with a risk type. The set of information may be a characteristic to identify the privacy vulnerability, as noted above. The set of information may be determined from one or more machine learning models trained to recognize characteristics of a security vulnerability. For example, web domains, third-party, fourth-party, and nth-party servers, domains, devices, requests, and the like may be associated with a risk type or security vulnerability. Such associations and any corresponding characteristics that may be known (e.g., location, request type, time of request, etc.) may assist in recognizing the risk type based on the script.

At block 724, embodiments may identify a browser operation utilizing the set of information. In various embodiments, the browser operation may include at least one of sending or receiving the set of information, or a subset of the set of information to an external party. The external party may be a third-party, fourth-party, or nth-party either directly or indirectly receiving the information.

At block 726, embodiments may assess a risk level based on the browser operation. The risk level may indicate a priority level for addressing the risk. For example, a high risk level will be targeted prior to a lower priority risk. In an example, a script analysis resulting in a determination of malware may be associated with a highest risk level. Efforts to block or combat the malware attack may accordingly take priority over a determination of a tracker or cookies being stored or created.

In various examples, analyzing scripts may occur asynchronously with an access of the web domain. Script analysis operations may occur in response to a web domain access request, but prior to the web domain access.

At block 730, embodiments may generate a customized privacy recommendation based on the privacy vulnerability. In examples, the privacy determination may occur prior to accessing the web domain. The customized privacy determination may indicate one or more risk types, privacy vulnerabilities, or proposed actions to address such vulnerabilities. In examples, the privacy determination is customized based, at least in part, on privacy preferences previously received. Again, the privacy preferences may be based on user preferences, and received via a computing device associated with a user, a dashboard operating on a computing device, and the like. The customized privacy determination may further be based on a ranking of vulnerabilities, as determined by the user and any settings preferences. As such, a user may identify specific types of security vulnerabilities, web domain risks, privacy settings, and the like, and ensure interactions with web domains conform to those sets of preferences. In various embodiments, the customized privacy determination may be provided on a user interface or the dashboard operating on the user interface.

At block 740, embodiments may block or combat the privacy vulnerability. Blocking techniques may include preventing a transfer of information to an external party. Similar to the privacy preferences, blocking techniques may also be customized to ensure that any threats or vulnerabilities may be handled in accordance with user preferences. In an example, a request for PII may be blocked such that no PII or PII-related information gets transferred to the requesting party. In various examples, a block on a transfer of information may occur before an interaction with the web domain by a user, or otherwise, prior to access of the web domain.

Combating techniques may include any of a plurality of techniques, as discussed herein, which directly address the security vulnerability. In an example, a combating technique may send false or spoofed information to a requesting external party. In an example, a request for PII may be combated by sending false information about the user. In some examples, the information sent may represent a most common demographic, computing device, hardware information, location, and the like.

In various embodiments, the inspection techniques discussed herein may occur periodically, at a time interval (e.g., every hour, day, month, at midnight, etc.), occur on-demand, occur asynchronously, and offer continuous monitoring of scripts associated with the web domain. Inspection operations may be scheduled such that it does not affect the real-time user experience. For example, embodiments may further utilize techniques to reduce latency such that, from a user experience, any lags or delays in web domain access, interaction, and/or operations are minimized or not noticed by the user.

In embodiments, systems and methods for determining and analyzing browser security vulnerabilities may comprise a first computing device, a second computing device in remote network connection with the first computing device, and a browser executing on the first computing device for accessing a web domain. A graphical user interface displayed on one or more computing devices may provide a customized dashboard for monitoring and managing security vulnerabilities.

In example embodiments, information indicative of a web domain access via a browser may be received from a first computing device. At least one inspection module may execute on the browser to analyze scripts associated with the web domain to identify privacy vulnerabilities, and a customized privacy determination may be generated based on one or more risk factors. As discussed herein, risk factors, privacy categorizations, and inspection techniques may comprise at least one of the following risks: malware, personal identifiable information (PII), session replays, fingerprinting, trackers, young domains, bad secure sockets layers (SSL), and dangerous or prohibited technologies. In an example PII detection may utilize Google DLP from the browser, for example, in base 64 and hex, and add heuristics to detect changes that may indicate that PII is being diverted.

Various embodiments are directed to the methods and strategies for analyzing a variety of online platforms, such as webpages, clients, client assets, and the like. Results from such operations and data may be catalogued, reviewed and presented from client assets. Monitoring, fingerprinting, etc.

In other embodiments, cookie inventory may be set by first- and third-parties. The cookie inventory may be separate from the risks discussed above. Accordingly, systems and methods may enable users to automatically check cookies against a privacy policy. They may also enable identification of online vulnerabilities, such as a web page or domain, that needs immediate attention.

Inspection and blocking techniques can further apply to cookies, cookie banners, content security policies, and phishing detection, among others. Inspection techniques discussed herein can identify certain features that may be present on and/or associated with a web page, a script of a web page, an associated web server, domain and the like. The presence of such features may provide a notification or alert to a user to make them aware of their presence, and thereby provide information, which may prompt a user to take action. Automatic protection techniques, such as blocking techniques may be implemented when such features are detected. Responses may be customized, e.g., depending on the feature type, based on user preferences. Such feature responses may be toggled on or off via a selection feature on the dashboard, for example. In various embodiments, users are able to customize their web experience, alerts, notifications, and the like to receive a desired level of protection and information about the any sites they may be interacting with.

In examples, embodiments may provide an audit of first party and third party cookies across a site. The audit may provide information including, for example, at least one of the name of the cookie, a cookie expiration date, a security assessment, session information, and domain information. Security information may include whether the site is secure or not. Session information may include whether the site and/or an application operating on the site includes session based authentication, token based authentication, or other type of authentication. Domain information may include information regarding domain(s) responsible for setting the cookie(s).

In various examples, users may adjust cookie and setting domains, for example, via the dashboard. Selections, which can occur via a toggle, button, or other selection feature available on a display or graphical user interface, may enable users to mark approvals for certain domains, certain cookies, and the like. As such, users have control over the cookies and domains during their web browsing experience.

Another feature includes an alert to notify users of any newly discovered cookies. The alert may be displayed via the dashboard, a pop-up, email, text, sound, or other type of notification, as discussed herein. The notifications and notification types may also be customized to user preferences and settings, thereby enabling users to obtain information in a desired manner and format.

In yet another example, systems and methods may identify whether a cookie banner is present on a page. Such information can be reported to the user in any of the alert, pop-up, and/or display notifications discussed herein. The cookie banner reporting may assist, for example, in highlighting pages in a site which does not have cookie consent functionality. Reporting may also identify sites which have, or do not, have cookie consent in a region or location. For example, some regions require cookie consent by law. Sites associated with that region, and which do not have that required cookie consent, could trigger an alert or notification to the client, making them aware that the site does not have the required cookie consent.

Another feature includes Content Security Policy (CSP) reporting. CSPs may be configured on a web server to provide security features. For examples, CSPs may assist in identifying certain security threats, such as malware distribution, cross-site scripting, data injection attacks, packet sniffing, and the like. CSP reports can provide, for example, which sites do or do not have CSPs. The reports can further provide a breakdown of the CSP across a site, on particular pages of the site, or a combination of each. As discussed herein, the reports may be provided via the dashboard and/or other notification graphically or visually provided to a user.

Alerts may further be provided to assist with phishing URL detection, protection, and alerting. In an example, if a third party attempts to inject an item, such as an iframe or a link, or automatically try to redirect the user to a known phishing site, embodiments could prevent that item from being created. Other embodiments, in addition to or instead of preventing creation, can stop and/or redirect the instructions. In an example of link creation, systems and methods can prevent the link from being created, stop the redirect, and/or prevent the link from being inserted into the document object model (DOM).

Another technique may prevent referrer information from being passed along to another site or party. In the example, the technique may disable any scripts or operations that would otherwise enable referrer information to be passed along. This may be done by changing anchor links, for example.

Systems and methods may further intelligently infer that a form is present on the page and populate the page with fake data to see if there is a request, such as an AJAX request that may pull data from the form.

Blocking and Combating Techniques

Figure 8:
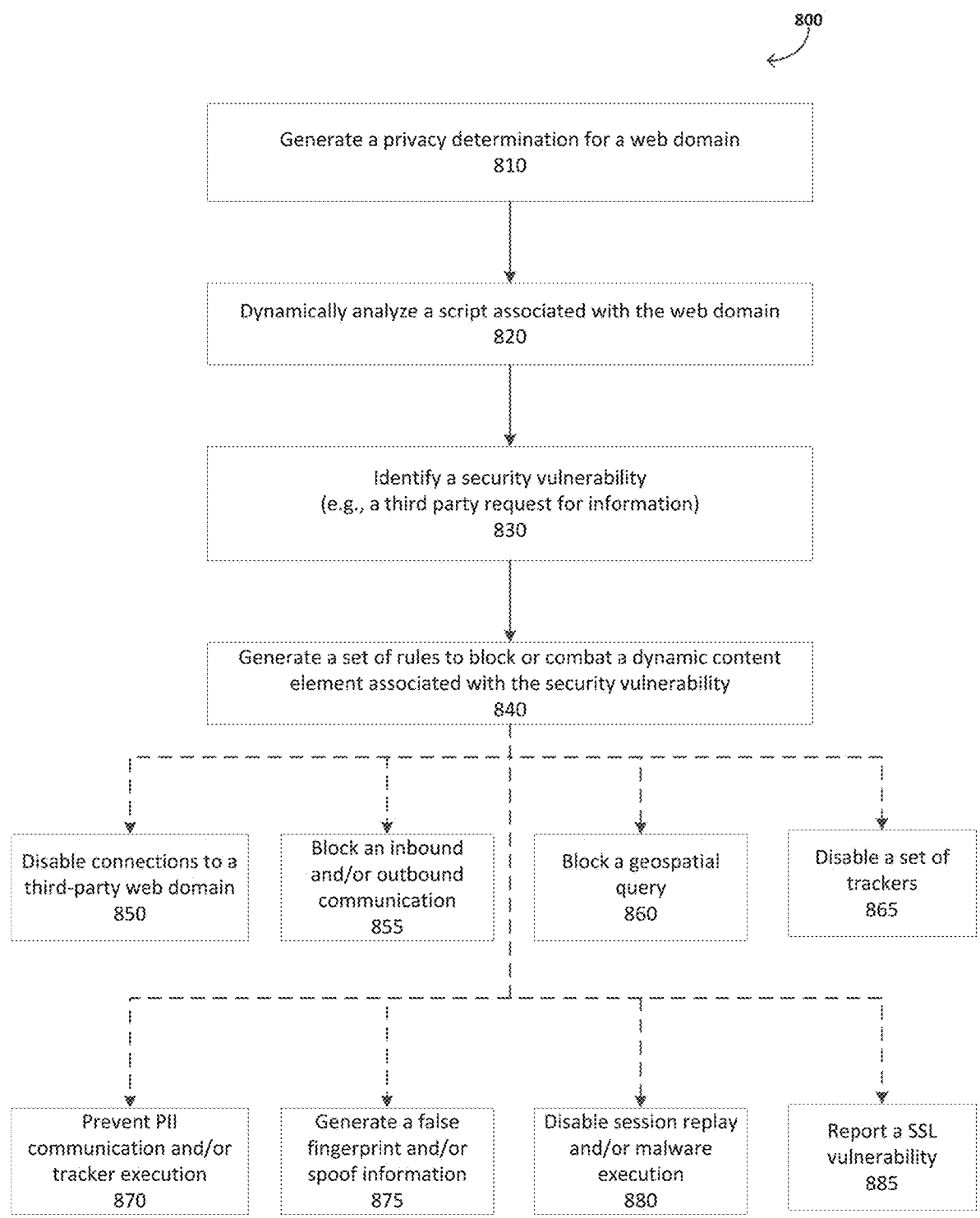
FIG. 8 illustrates a flowchart for blocking and combating techniques usable with embodiments discussed herein.

FIG. 8 illustrates a flowchart for blocking and combating techniques 800 in accordance with exemplary examples discussed herein. In an embodiment, systems and methods may dynamically prevent and/or block security vulnerabilities. A privacy determination may be generated for a web domain, accessible by one or more computing devices. Scripts associated with the web domain may be dynamically analyzed to determine a set of web applications requested private information. Private information may comprise PII, search history, and other interactions with the web domain. Based on the dynamically analyzed scripts, a set of rules associated with a security vulnerability may be generated to block and/or combat dynamic content elements.

At block 810, embodiments may generate a privacy determination for a web domain. The privacy determination may utilize one or more techniques discussed herein, at least with respect to FIG. 7. The privacy determination may identify one or more security vulnerabilities, risk types, and the like. For example, the privacy determination may identify an external web application requesting private information. The privacy determination may be provided on a dashboard displayed on a display and/or graphical user interface associated with a computing device.

At block 820, embodiments may dynamically analyze a script associated with the web domain. The script analysis operation may be similar to those discussed in FIG. 7. In other embodiments the script may be identified to be associated with a security vulnerability, and further analyzed to identify one or more characteristics to address the security vulnerability. The dynamic analysis can continuously occur during an interaction with the web domain. The instructions to dynamically analyze the script may further comprise monitoring, in real-time, third-party requests for information.

In various examples, the dynamic script analysis may begin upon receipt of a request to access the domain, but prior to a computing device accessing the domain. The dynamic script analysis can continue to occur as the web domain continues to be accessed. As such, the web domain and any scripts executing on the domain may be continuously analyzed to determine threats and vulnerabilities in real time.

At block 830, a security identify is analyzed, e.g., based on the dynamic script analysis 820. In various examples, the security vulnerability comprises a request from an external party, such as a third party, for identifying information. The identifying information can relate to one or more of information about a user, hardware associated with the user, an interaction on the web domain, interaction with one or more other web domains, web browsing information, a computing device associated with the user, a name, an address, financial information, or medical information. In various embodiments, the third party may be a web application.

At block 840, embodiments may generate a set of rules to block or combat a dynamic content element associated with the security vulnerability. The dynamic content element may comprise at least one of a domain object model (DOM) element, an image, a video, an audio element, a Cascading Style Sheet (CSS), a JavaScript element, an anchor link, an inline frame, and a form. In an example, the set of rules block the dynamic content element at a domain level or by wildcard Uniform Resource Locator (URL) matching. In another example, the set of rules may determine that the third party request is from a trusted third party, allow a transfer of identifying information to the trusted third party.

At blocks 850, 855, 860, and 865, embodiments may block dynamic content elements. Blocking dynamic content elements may comprise at least one of: disabling, a set of scripts operating on the web domain, wherein the set of scripts configured to communicate private information; disabling connections to a set of third-party web domains 850; blocking at least one of inbound and/or outbound communications 855; blocking geospatial queries 860; and disabling a set of trackers 865. One or more of the blocking techniques may occur individually or in combination.

At blocks 870, 875, 880, and 885, embodiments may combat dynamic content elements. Combating dynamic content elements may comprise at least one of: preventing communication of personal identifying information (PII) and/or tracker execution 870; generating a false fingerprint and/or spoof information 875; disabling session replay execution and/or malware execution 880; and reporting a secure sockets layer (SSL) vulnerability 885.

The following examples describe various blocking and combating techniques applicable to various embodiments discussed herein. For example, techniques may be directed to methods and strategies to prevent sharing of private information and data to unwanted applications. For example, blocking third-, fourth-, fifth-, nth-party web applications. Dynamic content elements may be blocked, for example, by adding a script relating to one or more of images, videos, audio, CSS, javascript, anchor links, iframes, forms, and the like, as discussed above. In other embodiments, any dynamically added DOM element may be used to initiate an HTTP request.

In various examples, PII may be targeted and blocked from being sent externally using a script. Embodiments may check for PII present in either plain text, base64 encoded or ArrayBuffers. The request may be blocked in the event that PII is discovered. Granular rules of trust may be used to allow trusted third parties to transmit PII if required.

Accordingly, to support and maintain site speed and user experience, such that users do not notice a real-time difference when interacting with a site, various techniques may be implemented, such as rendering less scripts in the browser, rendering scripts on a fast (10 GB) connection, such as at the CDN, or implementing smart cache invalidation.

Various implementations and configurations may also enable blocking functionality. For example, blocking of third-party requests can be done at either a domain level or by matching URLs against wildcard expressions. At the domain or wildcard level, for example, it may be defined by stream of third parties.

In accordance with embodiments discussed herein, various combating techniques may be implemented to actively counter malicious activity and security vulnerabilities. Combating techniques may occur in connection with and/or separate from various blocking techniques discussed herein.

In an example, PII sharing may be combatted by disabling PII information being sent outbound. Fingerprinting operations may be combatted and disabled for a site, and/or utilize fake data to provide a false fingerprint. Trackers may be disabled for an entire site, and in examples, utilize blocking techniques to prevent any trackers from getting on the web page. Session replay may disabled and similarly blocked on the inbound side to prevent any from reaching the page. Malware may be disabled and blocked for an entire site as well. Bad SSLs may be reported. Young domains may be disabled and blocked to prevent execution on a web page. Geographical information may be blocked as well, both on the inbound and outbound side.

In various embodiments, scripts may be allowed to load but sent back stripped or with fake data to trackers and fingerprinters. The fake data sent outbound may be tracked and thereby serve as a "honeypot."

Specific forms may also be populated with fake PII data in order to monitor third-party behavior in terms of the various privacy events and vulnerabilities discussed herein.

Form data can also be used to track the propagation of personal identifiable information to different external sources.

In another example, a noreferrer keyword for the rel attribute of the <a>, <area>, and <form> elements may be implemented where the target is not a first party. This instructs the browser, when navigating to the target resource, to omit the referrer header and otherwise share no referrer information. A trace may also be utilized in one or more techniques. In an example, a trace may be provided to show how a remote party, such as a fourth-, fifth-, nth party was introduced onto the page via a third-party. Any of the third-, fourth- or nth party can be combatted or blocked, independently or through association.

In additional examples, as discussed above, any of the blocking techniques discussed herein can apply to cookie reporting, cookie banners, CSPs, phishing, URL detection, and the like. Such techniques can identify certain features present on a page, web browser, within a script associated with a web page, and the like. Identified features, which may be security concerns and/or vulnerabilities, may be addressed, e.g., based on user-defined preferences.

Dynamic Protection Dashboard

Figure 9:
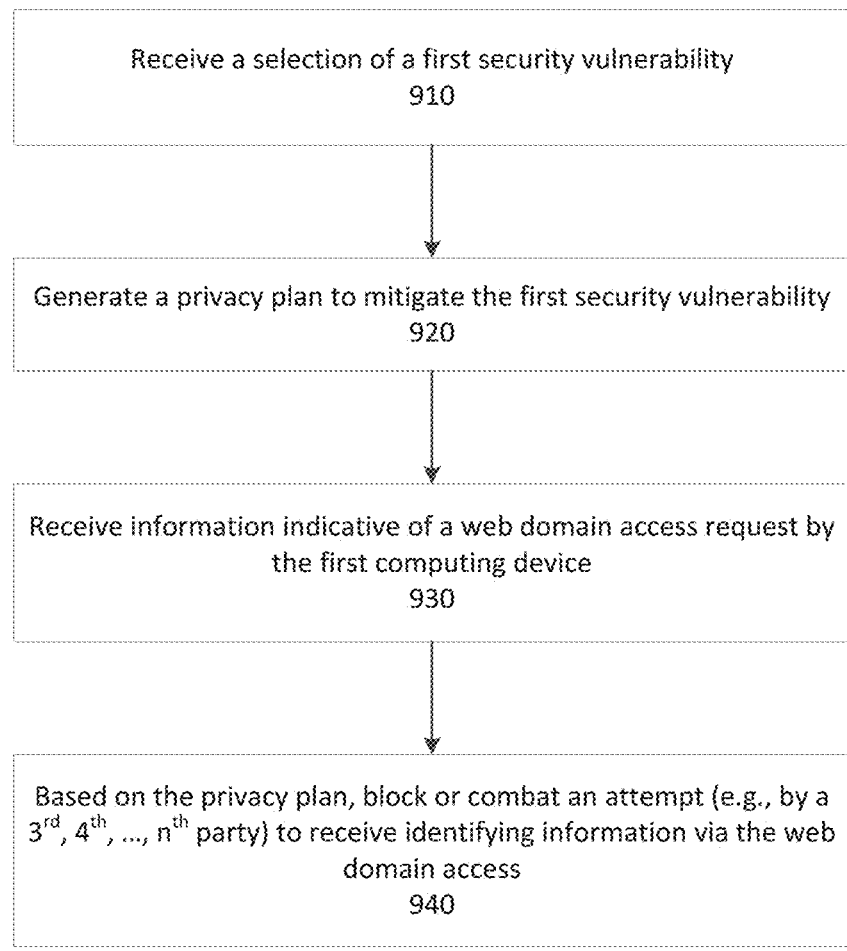
FIG. 9 illustrates a flowchart for additional blocking and combating techniques usable with embodiments discussed herein.

FIG. 9 illustrates a flowchart for additional blocking and combating techniques usable with embodiments discussed herein. Various embodiments may utilize a graphical user interface on a display associated with a computing device to visualize various protection operations, as discussed herein (see, e.g., FIGS. 2-6). The graphical user interface may comprise a dashboard, with various buttons, toggles, and rules to customize data privacy settings and protection. Settings and rules may be defined for one or more security vulnerabilities.

At block 910, embodiments may receive a selection of a first security vulnerability. The security vulnerability may relate to one or more the risks categories and types discussed herein.

At block 920, embodiments may generate a privacy plan to mitigate the first security vulnerability. The privacy plan may utilize one or more inspection, blocking, and combating techniques, as discussed herein. The privacy plan may be customized based on user preferences, historical risks, known risks, a set of web domains and/or external parties requesting information, and any of a plurality of considerations to ensure security vulnerabilities, and particularly, security vulnerabilities of highest risk or interest to a user, are addressed.

At block 930, embodiments may receive information indicative of a web domain access request by the first computing device. In embodiments, the first security vulnerability may me a selected vulnerability by a user, e.g., on a dashboard operating on a graphical user interface. The selection of the first security vulnerability may occur prior to any access or access request of a web domain. The timing may ensure that the security vulnerability may be addressed pre-emptively, and ensure protect against risks associated with the security vulnerability.

At block 940, embodiments may, based on the privacy plan, block or combat at attempt to receive identifying information via the web domain access. In an example, the attempt may be by an external party, such as a third party, a fourth party, or nth party directly or indirectly associated with one or more of the user or the web domain.

Embodiments may comprise a first computing device, a dashboard executing on the first computing device, and a second computing device comprising a processor and at least one memory in remote communication with the dashboard executing on the first computing device. As discussed herein, the dashboard may comprise a set of rules and/or settings related to security vulnerabilities and protection strategies to block, defend, and combat the vulnerabilities.

Some embodiments may receive a set of selected security vulnerabilities from the dashboard, generate a customized privacy plan, comprising a set of rules to prevent the set of selected security vulnerabilities, and execute the customized privacy plan on a web domain.

The dashboard may further generate at least one of a security alert, a notification regarding a security vulnerability, a privacy report and/or blueprint, various settings, privacy blueprints, automation defining security rules, and customizations. Such reports, alerts, and notifications may occur on a periodic basis (hourly, daily, weekly, etc.). In other embodiments, such alerts, reports and notifications may occur upon an occurrence of an event, such as a detection of a security vulnerability, a privacy threat, communications to a third-party, and the like.

Various embodiments may utilize a machine learning model to learn, customize, and protect a particular user or other operator of a computing device. For example, a machine learning module may be trained on at least one set of selected security vulnerabilities to automate the set of rules to be executed on the web domain.

Other exemplary features include protecting visible and interactive aspects, such as historical reporting of third party behavior, with respect to various security vulnerabilities, cookie inventory, and privacy issues. Such privacy issues may include but are not limited to the security risks, as discussed herein, with respect to terms malware, PII detection, session replay scripts, fingerprinting scripts, tracking scripts, young domains, a cookie request, a phishing attempt, a URL redirection, bad SSL certificates, and dangerous or prohibited geographies.

In other examples outbound integrations to third-party software may be specified for the purpose of channeling alerts to external systems where the data can be combined and enriched with other data sources (or for archival purposes).

Specifying inbound integrations that can be used to augment reporting capabilities for a user and/or organization's sites. Manual third party categorization rules may be used to train a machine learning model that can be leveraged to suggest or automate categorization rules when new third parties are discovered on Organizational sites.

In additional embodiments, organizations may be allowed to approve, e.g., from an audit of cookies, which sites should be allowed to be set without the web site user's consent.

In the various examples discussed herein, systems and methods may provide alerts upon an occurrence of an event, such as when unapproved cookies get set in the browser.

Embodiments may further present the ability to specify and change the PII that should be traced. These settings can be set independently on each Privacy Edge managed site and can contain PII attributes that closely align with a user and/or organization's industries and geographical regions. Such PII settings may be site specific and the configuration may be used various embodiments to identify PII leaving the site to third-parties.

The network and system configurations for various operations may comprise operations embedded in the CDN and/or PCP in a browser. Rael time protections for combatting and blocking may be done using a JavaScript library. This library may be hosted on a local or remote storage or server, in close proximity to the web site visitors location. In embodiments, the library may require only a single request to be retrieved, loaded and initiated into the browser.

Various implementations may act as a client side proxy that "hooks" itself as an interceptor of DOM methods in the browser. A third party would be forced to pass through privacy checks before being either allowed, prevented from calling particular DOM methods. The interception can also return fake data to the callee, with the express purpose of preventing data points from being combined together in a way that can identify web users.

In addition, PII checking may be decoupled from other supporting services. If required, users and/or organizations can host this service themselves and thus retain control of any PII handling. Telemetry may also be used for various combatting and blocking operations. Such information may then be used for alerting, reporting and improving the site's privacy rules.

Other key features may include PII Removal, device fingerprinting, and inspections of pages from different geographical regions using proxies. Such features improve the reporting and capturing of security and privacy vulnerabilities, as third-party resources and web site functionality often behave differently based on delivery features of CDNs.

Embodiments may also place third-parties into different categories of trust. Within each category a user may independently turn on and off the ability to alert and combat/block various security and privacy vulnerabilities based on particular privacy checks. For example, a user may choose to trust and not combat a legitimate and trusted bot fingerprinting script placed on their site. But they could, however, block that script if the script ever flagged as malware.

Figure 10:
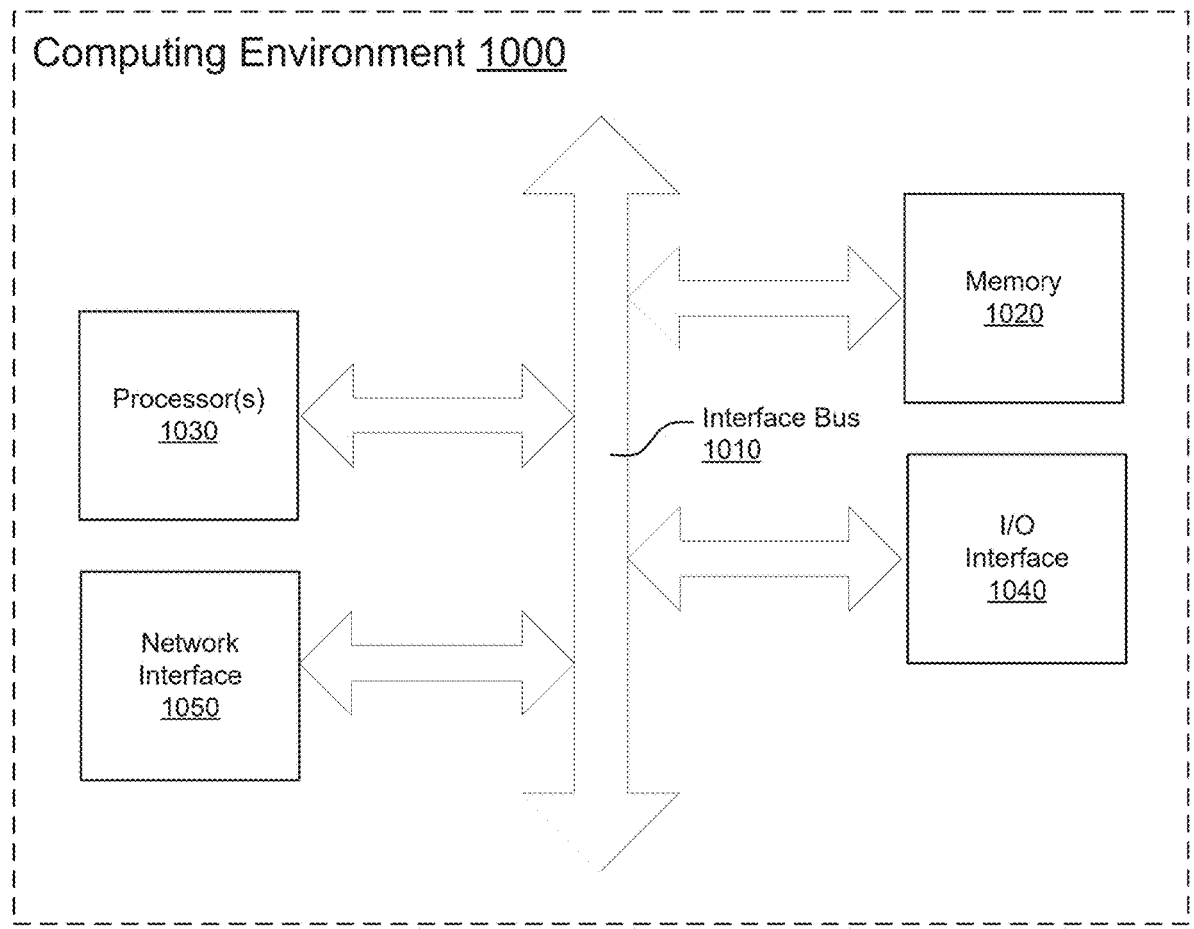
FIG. 10 is a block diagram of computing systems and methods usable with embodiments discussed herein; and, FIG. 11 is an overview of a computing systems in accordance with embodiments discussed herein.

FIG. 10 depicts an example computing environment 1000 suitable for implementing aspects of the embodiments of the present invention, including the control system, which can integrate one or more devices, computing, and lighting systems. As utilized herein, the phrase "computing system" generally refers to a dedicated computing device with processing power and storage memory, which supports operating software that underlies the execution of software, applications, and computer programs thereon. As used herein, an application is a small, in storage size, specialized program that is downloaded to the computing system or device. In some cases, the application is downloaded from an "App Store" such as APPLE's APP STORE or GOOGLE's ANDROID MARKET. After download, the application is generally installed on the computer system or computing device. As shown by FIG. 10, computing environment 1000 includes bus 1010 that directly or indirectly couples the following components: memory 1020, one or more processors 1030, I/O interface 1040, and network interface 1050. Bus 1010 is configured to communicate, transmit, and transfer data, controls, and commands between the various components of computing environment 1000.

Computing environment 1000 typically includes a variety of computer-readable media. Computer-readable media can be any available media that is accessible by computing environment 1000 and includes both volatile and nonvolatile media, removable and non-removable media. Computer-readable media may comprise both computer storage media and communication media. Computer storage media does not comprise, and in fact explicitly excludes, signals per se.

Computer storage media includes volatile and nonvolatile, removable and non-removable, tangible and non-transient media, implemented in any method or technology for storage of information such as computer-readable instructions, data structures, program modules or other data. Computer storage media includes RAM; ROM; EE-PROM; flash memory or other memory technology; CD-ROMs; DVDs or other optical disk storage; magnetic cassettes, magnetic tape, magnetic disk storage or other magnetic storage devices; or other mediums or computer storage devices which can be used to store the desired information and which can be accessed by computing environment 1000.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, communication media includes wired media, such as a wired network or direct-wired connection, and wireless media, such as acoustic, RF, infrared and other wireless media. Combinations of any of the above should also be included within the scope of computer-readable media.

Memory 1020 includes computer-storage media in the form of volatile and/or nonvolatile memory. The memory may be removable, non-removable, or a combination thereof. Memory 1020 may be implemented using hardware devices such as solid-state memory, hard drives, optical-disc drives, and the like. Computing environment 1000 also includes one or more processors 1030 that read data from various entities such as memory 1020, I/O interface 1040, and network interface 1050.

I/O interface 1040 enables computing environment 1000 to communicate with different input devices and output devices. Examples of input devices include a keyboard, a pointing device, a touchpad, a touchscreen, a scanner, a microphone, a joystick, and the like. Examples of output devices include a display device, an audio device (e.g., speakers), a printer, and the like. These and other I/O devices are often connected to processor 1010 through a serial port interface that is coupled to the system bus, but may be connected by other interfaces, such as a parallel port, game port, or universal serial bus (USB). A display device can also be connected to the system bus via an interface, such as a video adapter which can be part of, or connected to, a graphics processor unit. I/O interface 1040 is configured to coordinate I/O traffic between memory 1020, the one or more processors 1030, network interface 1050, and any combination of input devices and/or output devices.

Network interface 1050 enables computing environment 1000 to exchange data with other computing devices via any suitable network. In a networked environment, program modules depicted relative to computing environment 1000, or portions thereof, may be stored in a remote memory storage device accessible via network interface 1050. It will be appreciated that the network connections shown are exemplary and other means of establishing a communications link between the computers may be used.

Figure 11:
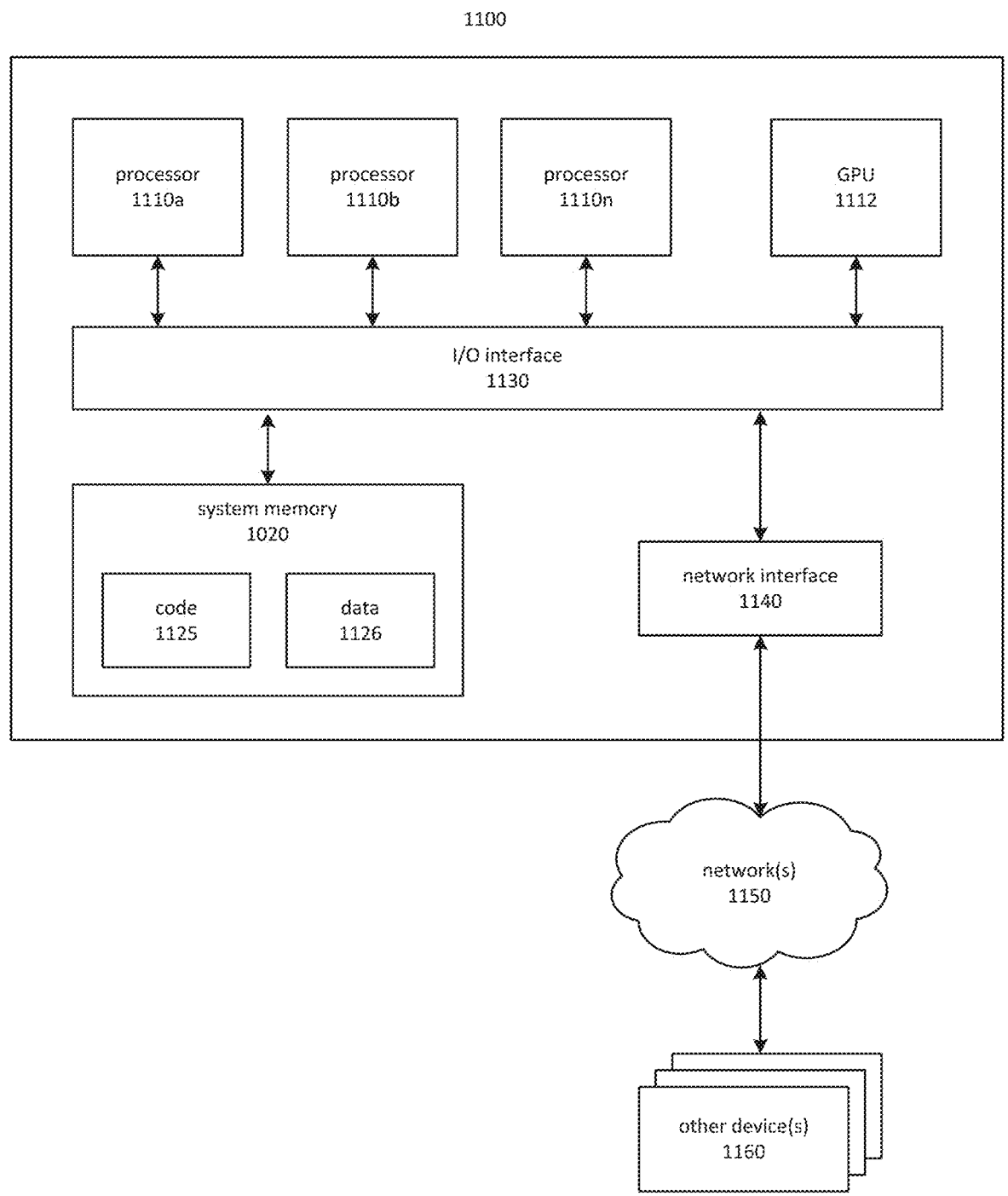

In at least some embodiments, a server that implements a portion or all of one or more of the technologies described herein may include a general-purpose computer system that includes or is configured to access one or more computer-accessible media. FIG. 11 depicts a general-purpose computer system that includes or is configured to access one or more computer-accessible media. In the illustrated embodiment, computing device 1100 includes one or more processors 1110a, 1110b, and/or 1110n (which may be referred herein singularly as a processor or in the plural as the processors 1110) coupled to a system memory 1120 via an input/output ("I/O") interface 1130. Computing device 1100 further includes a network interface 1140 coupled to I/O interface 1130.

In various embodiments, computing device 1100 may be a uniprocessor system including one processor 1110 or a multiprocessor system including several processors 1110 (e.g., two, four, eight, or another suitable number). Processors 1110 may be any suitable processors capable of executing instructions. For example, in various embodiments, processors 1110 may be general-purpose or embedded processors implementing any of a variety of instruction set architectures ("ISAs"), such as the x86, PowerPC, SPARC or MIPS ISAs, or any other suitable ISA. In multiprocessor systems, each of processors 1110 may commonly, but not necessarily, implement the same ISA.

In some embodiments, a graphics processing unit ("GPU") 1112 may participate in providing graphics rendering and/or physics processing capabilities. A GPU may, for example, comprise a highly parallelized processor architecture specialized for graphical computations. In some embodiments, processors 1110 and GPU 1112 may be implemented as one or more of the same type of device.

System memory 1120 may be configured to store instructions and data accessible by processor(s) 1110. In various embodiments, system memory 1120 may be implemented using any suitable memory technology, such as static random access memory ("SRAM"), synchronous dynamic RAM ("SDRAM"), nonvolatile/Flash®-type memory, or any other type of memory. In the illustrated embodiment, program instructions and data implementing one or more desired functions, such as those methods, techniques, and data described above, are shown stored within system memory 1120 as code 1125 and data 1126.

In one embodiment, I/O interface 1130 may be configured to coordinate I/O traffic between processor 1110, system memory 1120, and any peripherals in the device, including network interface 1140 or other peripheral interfaces. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect ("PCI") bus standard or the Universal Serial Bus ("USB") standard, for example. In some embodiments, the function of I/O interface 1130 may be split into two or more separate components, such as a north bridge and a south bridge, for example. Also, in some embodiments some or all of the functionality of I/O interface 1130, such as an interface to system memory 1120, may be incorporated directly into processor 1110.

Network interface 1140 may be configured to allow data to be exchanged between computing device 1100 and other device or devices 1160 attached to a network or networks 1150, such as other computer systems or devices, for example. In various embodiments, network interface 1140 may support communication via any suitable wired or wireless general data networks, such as types of Ethernet networks, for example. Additionally, network interface 1140 may support communication via telecommunications/telephony networks, such as analog voice networks or digital fiber communications networks, via storage area networks, such as Fibre Channel SANs (storage area networks), or via any other suitable type of network and/or protocol.

In some embodiments, system memory 1120 may be one embodiment of a computer-accessible medium configured to store program instructions and data as described above for implementing embodiments of the corresponding methods and apparatus. However, in other embodiments, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device 1100 via I/O interface 1130. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 1100 as system memory 1120 or another type of memory. Further, a computer-accessible medium may include transmission media or signals, such as electrical, electromagnetic or digital signals, conveyed via a communication medium, such as a network and/or a wireless link, such as those that may be implemented via network interface 1140. Portions or all of multiple computing devices, such as those illustrated in FIG. 11, may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as tablet computers, personal computers, smartphones, game consoles, commodity-hardware computers, virtual machines, web services, computing clusters, and computing appliances. Any of these computing devices or environments may, for convenience, be described as compute nodes or as computing nodes.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines ("JVMs"), general-purpose or special-purpose operating systems, platforms that support various interpreted or compiled programming languages, such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources, and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server, or some combination of the two. Various types and configurations of instances may be made available, including different sizes of resources executing different operating systems ("OS") and/or hypervisors, and with various installed software applications, runtimes, and the like. Instances may further be available in specific availability zones, representing a logical region, a fault tolerant region, a data center, or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage, such as, e.g., volatile or non-volatile storage.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

The foregoing description of the embodiments has been presented for the purpose of illustration; it is not intended to be exhaustive or to limit the patent rights to the precise forms disclosed. Persons skilled in the relevant art may appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which may be executed by a computer processor for performing any or all of the steps, operations, or processes described.

Embodiments also may relate to an apparatus for performing the operations herein, and/or to a product that is produced by a computing process described herein. This apparatus may be specially constructed for the required purposes, and/or it may comprise a computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

What is claimed:

1. A method for analyzing browser security vulnerabilities, comprising:
   receiving information indicative of a request to access a web domain via a browser executing on a first computing device;
   analyzing scripts associated with the web domain to identify a privacy vulnerability; and
   generating a customized privacy determination based on the privacy vulnerability,
   wherein analyzing the scripts associated with the web domain comprises;
   determining a set of information associated with a risk type;
   identifying a browser operation utilizing the set of information; and
   assessing a risk level associated with the privacy vulnerability based on the browser operation, wherein the risk level indicates a priority level for addressing the privacy vulnerability; and
   wherein the risk type comprises at least one of malware, personal identifiable information, session replay, fingerprinting, trackers, young domains, a cookie request, a phishing attempt, a URL redirection, a bad secure sockets layer (SSL).

2. The method of claim 1, wherein the set of information comprises identifying information about one or more of a user, an interaction on the web domain, or a computing device associated with the user.

3. The method of claim 1, wherein the browser operation includes at least one of sending or receiving the set of information to an external party.

4. The method of claim 1, wherein generating the customized privacy determination occurs prior to accessing the web domain.

5. A method for analyzing browser security vulnerabilities, comprising:
   receiving information indicative of a web domain access request via a browser executing on a first computing device;
   analyzing scripts associated with the web domain to identify a risk level associated with a privacy vulnerability, wherein the risk level indicates a priority level for addressing the privacy vulnerability;
   generating a customized privacy determination based on the privacy vulnerability; and,
   wherein analyzing scrips occurs asynchronously with an access of the web domain.

6. A system for analyzing browser security vulnerabilities comprising:

an inspection module operating on a computing device configured to access a web domain via a browser, wherein the inspection module comprises instructions, which when executed on a processor associated with the computing device, cause the processor to at least:
receive information indicative of a web domain access request via a browser executing on a first computing device;
analyze scripts associated with the web domain to identify a risk level associated with a privacy vulnerability, wherein the risk level indicates a priority level for addressing the privacy vulnerability;
generate a customized privacy determination based on the privacy vulnerability; and
wherein the privacy vulnerability is based on a customized, configurable set of privacy considerations received at a user interface associated with the computing device.

7. The system of claim 6, wherein the instructions to analyze scripts associated with the web domain further comprise:
determining a set of information associated with a risk type;
identifying a browser operation utilizing the set of information; and
assessing a risk level based on the browser operation.

8. The system of claim 7, wherein the risk type comprises at least one of: malware, personally identifiable information, session replay, fingerprinting, trackers, young domains, a cookie request, a phishing attempt, a URL redirection, a bad secure sockets layer (SSL), and wherein the set of information comprises identifying information about one or more of a user, an interaction on the web domain, or a computing device associated with the user.

9. The system of claim 6, wherein the browser operation includes at least one of sending or receiving the set of information to an external party.

10. A system for analyzing browser security vulnerabilities comprising:
an inspection module operating on a computing device configured to access a web domain via a browser, wherein the inspection module comprises instructions, which when executed on a processor associated with the computing device, cause the processor to at least:
receive information indicative of a web domain access request via a browser executing on a first computing device;
analyze scripts associated with the web domain to identify a risk level associated with a privacy vulnerability, wherein the risk level indicates a priority level for addressing the privacy vulnerability;
generate a customized privacy determination based on the privacy vulnerability; and,
instructions that cause the processor to block a transfer of information associated with the privacy vulnerability.

11. A system for analyzing browser security vulnerabilities comprising:
an inspection module operating on a computing device configured to access a web domain via a browser, wherein the inspection module comprises instructions, which when executed on a processor associated with the computing device, cause the processor to at least:
receive information indicative of a web domain access request via a browser executing on a first computing device;
analyze scripts associated with the web domain to identify a risk level associated with a privacy vulnerability, wherein the risk level indicates a priority level for addressing the privacy vulnerability;
generate a customized privacy determination based on the privacy vulnerability; and,
display the customized privacy determination on a user interface.

12. A non-transitory, computer-readable medium comprising instructions that, when executed on a computing device, cause the computing device to:
receive information indicative of a web domain access request via a browser;
analyze scripts associated with the web domain to identify a risk level associated with a privacy vulnerability, wherein the risk level indicates a priority level for addressing the privacy vulnerability;
generate a customized privacy determination based on the privacy vulnerability; and,
blocking a transfer of information associated with the privacy vulnerability.

13. A non-transitory, computer-readable medium comprising instructions that, when executed on a computing device, cause the computing device to:
receive information indicative of a web domain access request via a browser;
analyze scripts associated with the web domain to identify a risk level associated with a privacy vulnerability, wherein the risk level indicates a priority level for addressing the privacy vulnerability; and
generate a customized privacy determination based on the privacy vulnerability; and disable a transfer of referrer information.

14. A non-transitory, computer-readable medium comprising instructions that, when executed on a computing device, cause the computing device to:
receive information indicative of a web domain access request via a browser;
analyze scripts associated with the web domain to identify a risk level associated with a privacy vulnerability, wherein the risk level indicates a priority level for addressing the privacy vulnerability;
generate a customized privacy determination based on the privacy vulnerability; and
block a transfer of information associated with the privacy vulnerability before an interaction with the web domain by a user.

15. A non-transitory, computer-readable medium comprising instructions that, when executed on a computing device, cause the computing device to:
receive information indicative of a web domain access request via a browser;
analyze scripts associated with the web domain to identify a privacy vulnerability;
generate a customized privacy determination based on the privacy vulnerability; and
send spoofed information to a requesting party associated with the privacy vulnerability.

16. A non-transitory, computer-readable medium comprising instructions that, when executed on a computing device, cause the computing device to:
receive information indicative of a request to access a web domain request via a browser;
analyze scripts associated with the web domain to identify a privacy vulnerability;
generate a customized privacy determination based on the privacy vulnerability; and,
wherein analyzing the scripts associated with the web domain comprises;

determining a set of information associated with a risk type;
identifying a browser operation unitizing the set of information; and
assessing a risk level associated with the privacy vulnerability based on the browser operation, wherein the risk level indicates a priority level for addressing the privacy vulnerability; and wherein risk type comprises at least one of: malware, personal identifiable information, session replay, fingerprinting, trackers, young domains, a cookie request, a phishing attempt, a URL redirection, a bad secure sockets layer (SSL), and wherein the set of information comprises identifying information about one or more of a user, an interaction on the web domain, or a computing device associated with the user.

* * * * *